United States Patent
Huang et al.

(10) Patent No.: US 12,200,098 B2
(45) Date of Patent: Jan. 14, 2025

(54) POWER SUPPLYING DEVICE, METHOD AND SECURE SYSTEM

(71) Applicant: NUVOTON TECHNOLOGY CORPORATION, Hsinchu (TW)

(72) Inventors: Po-Hsuan Huang, Hsinchu (TW); Chung Ming Hsieh, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 360 days.

(21) Appl. No.: 17/948,850

(22) Filed: Sep. 20, 2022

(65) Prior Publication Data

US 2023/0094277 A1 Mar. 30, 2023

Related U.S. Application Data

(60) Provisional application No. 63/248,664, filed on Sep. 27, 2021.

(30) Foreign Application Priority Data

Apr. 6, 2022 (TW) .................................. 111113054

(51) Int. Cl.
*H04L 9/00* (2022.01)
*G06F 1/26* (2006.01)

(52) U.S. Cl.
CPC .............. *H04L 9/003* (2013.01); *G06F 1/263* (2013.01)

(58) Field of Classification Search
CPC ............. H04L 9/003; G06F 1/263; G06F 1/30
See application file for complete search history.

(56) References Cited

U.S. PATENT DOCUMENTS

| | | | |
|---|---|---|---|
| 2008/0307240 A1* | 12/2008 | Dahan | G06F 1/324 713/320 |
| 2013/0015913 A1* | 1/2013 | Horikawa | G06F 1/3296 327/538 |
| 2014/0183972 A1* | 7/2014 | Endo | H02J 50/12 307/104 |

* cited by examiner

*Primary Examiner* — Esther B. Henderson
(74) *Attorney, Agent, or Firm* — MUNCY, GEISSLER, OLDS & LOWE, P.C.

(57) ABSTRACT

A power supply device is used to provide power to an encryption and decryption device of a security system, including a safety power supply device, which is used to supply the supply voltage according to the system voltage; a regulated voltage source, which is used to provide a regulated voltage; and a voltage selection device, which is electrically connected with the safety power supply device, the stable voltage source and the encryption and decryption device. During the startup period of the security system, or, after the startup period of the security system and the encryption/decryption device performs encryption/decryption, only the supply voltage is selected as the driving voltage of the encryption/decryption device. After the startup period of the security system and the encryption and decryption device does not perform encryption and decryption, the voltage only the regulated voltage is selected as the driving voltage of the encryption and decryption device.

19 Claims, 5 Drawing Sheets

POWER SUPPLYING DEVICE, METHOD AND SECURE SYSTEM

CROSS-REFERENCE TO RELATED APPLICATION

This application claims the priority benefit of U.S. application Ser. No. 63/248,664, filed on Sep. 27, 2021, and Taiwan application serial no. 111113054, filed on Apr. 6, 2022. The full disclosure of which is incorporated herein by reference.

BACKGROUND

Technical Field

The present disclosure relates to a power supplying device, method and secure system. More particularly, the present disclosure relates to a power supplying device method and secure system that may prevent hackers from obtaining security information maliciously by detecting a change of a system voltage of a power source and a change of the corresponding current value.

Description of Related Art

In recent years, safety applications are implemented in many arts, including ID cards, credit cards, computer access control and mobile phones (e.g., SIM cards). These applications usually realize the high security with the encrypted computing of the key embedded in the storage device; however, hackers try to access these keys to generate the unauthorized trades. For example, the side attack is the most common way to access the messages from a card or a computing system during the period of the regular operation, and it is to decrypt the accessed key according to the sequence signal, the power consumption and the electromagnetic field of the card or the computing system. Thus, it is necessary to consider how to maintain data security and defend side attack when designing the secure system.

The situation of the side attack is described as follows. During switching of logic gates of an encryption/decryption device, hackers may detect a current change and power characteristics generated by the current change; usually, a driving voltage applied to the encryption/decryption device is also changed with the current change). These power characteristics are monitored through the power pins can used to recover the key. To prevent the power signal and the ground signal from being read from the logic gates, the power pin and the ground pin are usually isolated from the external pad.

Refer to FIG. 1, which is a circuit diagram of a secure system in the prior art. The secure system 1 includes a power 10, a power supply device 12 and an encryption/decryption device 14, wherein the power supply device 12 is electrically connected to the power 10 and the encryption/decryption device 14, in order to prevent hackers from obtaining power characteristics associated with security information by detecting a power pin and a ground pin of the power 10. The power supply device 12 includes a plurality of switches SW1~SW5 and a charge storage capacitor CS. One terminal of the switch SW1 is electrically connected to a system voltage of the power 10, and the other terminal of the switch SW1 is electrically connected to one terminal of the switch SW2, one terminal of the switch SW5 and one terminal of the charge storage capacitor CS. The other terminal of the switch SW2 is electrically connected to one terminal of the encryption/decryption device 14, so as to output a supply voltage to the encryption/decryption device 14 as a driving voltage of the encryption/decryption device 14. One terminal of the switch SW3 is electrically connected to a ground voltage of the power 10, and other terminal of the switch SW3 is electrically connected to one terminal of the switch SW4, the other terminal of the switch SW5, and the other terminal of the charge storage capacitor CS. The other terminal of the switch SW4 is electrically connected to the other terminal of the encryption/decryption device 14, so as to provide the ground voltage to the encryption/decryption device 14.

The process that the power supply device 12 provides the supply voltage is shown as follows. Firstly, at a first phase, only the switch SW5 is turned on and other switches SW1~SW4 are turned off, so as to discharge the charge storage capacitor CS to a specific voltage level, i.e., the switch SW5 is used as a reset switch. At a second phase, the switches SW1 and SW3 are turned on, and other switches SW2, SW4 and SW5 are turned off, so that the charge storage capacitor CS is charged by the system voltage of the power 10, and a third phase is executed after the charge storage capacitor CS is charged to the voltage level of the system voltage. At the third phase, the switches SW2 and SW4 are turned on, other switches SW1, SW3 and SW5 are turned off, and the charge storage capacitor CS provides the supply voltage to the encryption/decryption device 14 as the driving voltage. Then, at the fourth phase, the encryption/decryption device 14 is allowed to encrypt/decrypt. After finishing the fourth phase, turn back to the first phase.

Through the manner described above, it may prevent hackers from obtaining the power characteristics associated with the security information by detecting the power pin and the ground pin of the power 10. However, the above-mentioned manner requires enough charge capacity stored in the charge storage capacitor CS to provide a large amount of charges consumed by the encryption/decryption device 14 for encrypting and decrypting. Furthermore, the manner is not a power saving solution because it has to discharge the charge storage capacitor CS to a scheduled voltage level at the first phase. Additionally, the larger size the charge storage capacitor CS is, the longer the charge/discharge time is, so the manner is time-consuming overall. Not to mention that the manner needs four phases to ensure the encryption/decryption device 14 works as normal.

SUMMARY

An embodiment of the present disclosure provides a power supply device, configured to supply a power to an encryption/decryption device of a secure system, including a secure power supply device, a stable voltage source and a voltage selection device. The secure power supply device is configured to provide a supply voltage according to a system voltage. The stable voltage source is configured to provide a stable voltage. The voltage selection device is electrically connected to the secure power supply device, the stable voltage source and the encryption/decryption device. During a startup period of the secure system, or, when an encryption/decryption is executed by the encryption/decryption device after the startup period of the secure system, the voltage selection device selects only the supply voltage as the driving voltage for the encryption/decryption device, and when an encryption/decryption is not executed by the encryption/decryption device after the startup period of the secure system, the voltage selection device selects only the stable voltage as the driving voltage for the encryption/decryption device.

An embodiment of the present disclosure further provides a secure system, including the power supply device and the encryption/decryption device.

An embodiment of the present disclosure further provides a power supplying method, configured to provide a power to an encryption/decryption device of a secure system, and includes the following steps. During a startup period of the secure system, a supply voltage provided by a secure power supply device is selected as the driving voltage for the encryption/decryption device. When an encryption/decryption is executed by the encryption/decryption device after the startup period of the secure system, the supply voltage is selected as the driving voltage for the encryption/decryption device. When the encryption/decryption is not executed by the encryption/decryption device after the startup period of the secure system, a stable voltage provided by a stable voltage source is selected as the driving voltage for the encryption/decryption device. In a situation that the supply voltage is selected as the driving voltage for the encryption/decryption device, if the driving voltage is fallen outside a voltage range between an upper limit voltage and a lower limit voltage, the supply voltage is adjusted until the driving voltage is fallen within the voltage range.

In summary, compared to the prior art, a plurality of power supply devices, methods and secure systems provided in the embodiments of the present disclosure may obtain at least one of the technical effects as follows: reducing the size that the charge storage capacitor needs, the operating time, the current consumption, and the circuit area. The power supply device provided in the embodiment of the present disclosure may protect the secure system effectively, and prevent hackers from obtaining the security information through the power characteristics detected by the power pin and the ground pin.

In order to further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable person having ordinary skill in the art can further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DETAILED DESCRIPTION

Figure 1:
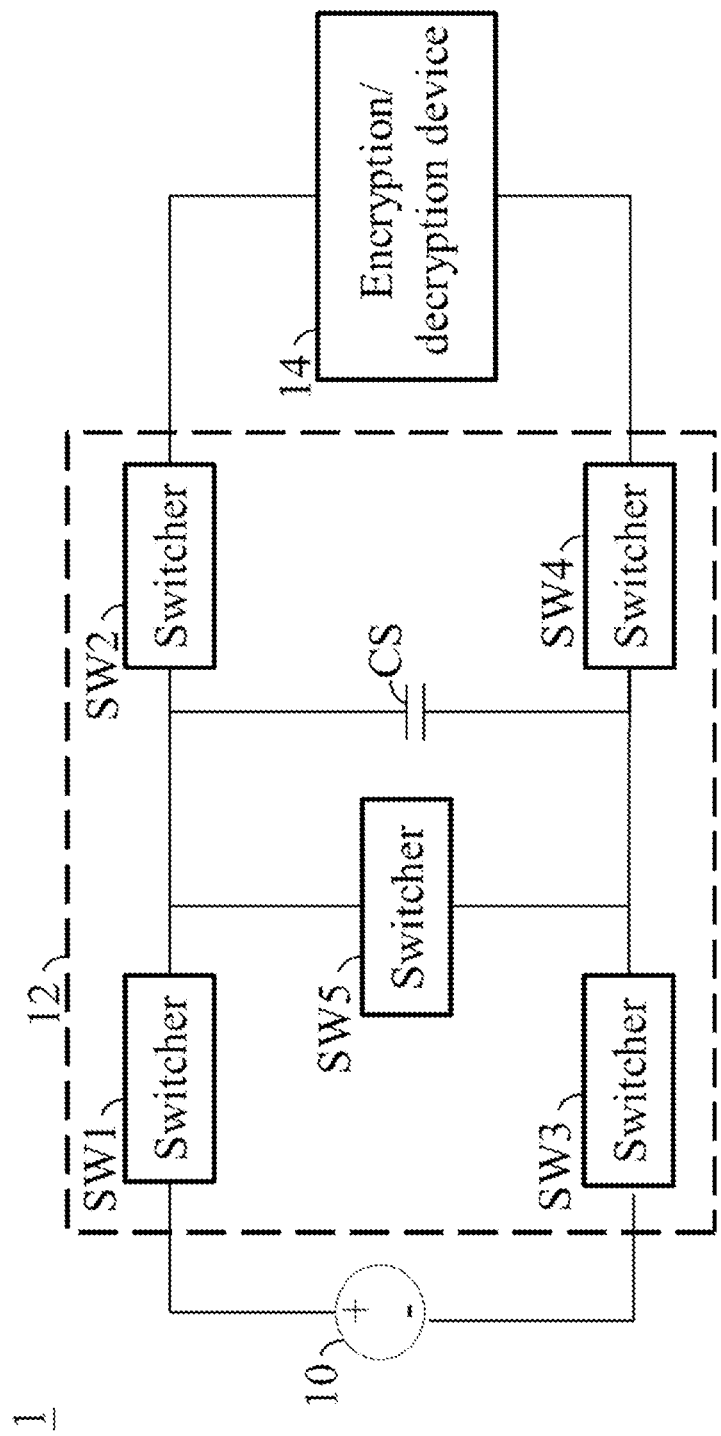
FIG. 1 is a circuit diagram of a secure system in the prior art.

Reference will now be made in detail to exemplary embodiments of the present disclosure, exemplary embodiments of which are illustrated in the accompanying drawings. Wherever possible, the same element number is used in the drawings and the description to refer to the same or the similar part. Furthermore, exemplary embodiments are only one of implemental ways in the concept of design of the present disclosure, none of exemplars described below is intended to limit the present disclosure.

In order to solve the issues in the prior art, a plurality of power supply devices, methods and secure systems provided in the embodiments of the present disclosure may prevent hackers from obtaining the security information through the power characteristics detected by the power pin and the ground pin, and may also obtain one of the technical effects as follows: reducing the size that the charge storage capacitor needs, the operating time, the current consumption, and the circuit area when achieving the safety protection effect.

In an embodiment of the present disclosure, a power supply device includes a secure power supply device, a stable voltage source and a voltage selection device, wherein the voltage selection device is composed by the mode switch controller and the switch. During the startup period, the mode switch controller controls the switch to be turned off, only the supply voltage provided by the power supply device is used as the driving voltage. In the startup period, when the driving voltage of the encryption/decryption device is less than the lower limit voltage, the supply voltage is increased. Later, when the driving voltage is greater than the upper limit voltage, the supply voltage is decreased. If the driving voltage is less than the lower limit voltage again, the supply voltage is increased again. During the startup period, by adjusting the supply voltage for a period of time, the driving voltage is fallen within the voltage range between the upper limit voltage and the lower limit voltage. After the startup period is finished, the mode switch controller controls the switch to be turned off or turned on according to whether the encryption/decryption device executes the encryption/decryption, so as to determine whether selecting the supply voltage provided by the secure power supply device or selecting the stable voltage provided by the stable voltage as the driving voltage for the encryption/decryption device. Similarly, after the startup period is finished, if selecting the supply voltage as the driving voltage, once the driving voltage is fallen outside the voltage range, the supply voltage is increased or decreased, so that the driving voltage may be fallen within the voltage range.

This manner makes the stable voltage source maintain the driving voltage as the stable voltage when the encryption/decryption device does not execute the encryption/decryption after the startup period is finished. Only when the encryption/decryption device executes the encryption/decryption, selecting only the supply voltage provided by the secure power supply device as the driving voltage for the encryption/decryption device, so as to solve the technical issue that the driving voltage is suddenly decreased since the encryption/decryption device needs huge current consumption when executing the encryption/decryption. Compared to the prior art, the manner in the embodiment may reduce the size that the charge storage capacitor needs, the operating time, the current consumption, and the circuit area. On the other hand, since the supply has been adjusted during the startup period, the driving voltage is fallen within the voltage range. Thus, after the startup period is finished, if changing to select the supply voltage as the driving voltage, it may use the voltage value of the supply voltage that makes the driving voltage be fallen within the voltage range (e.g., through several conductive switching current units), so as to reduce the adjustment time of the supply voltage, i.e., it takes less time for the driving voltage to be fallen within the voltage range.

Figure 2:
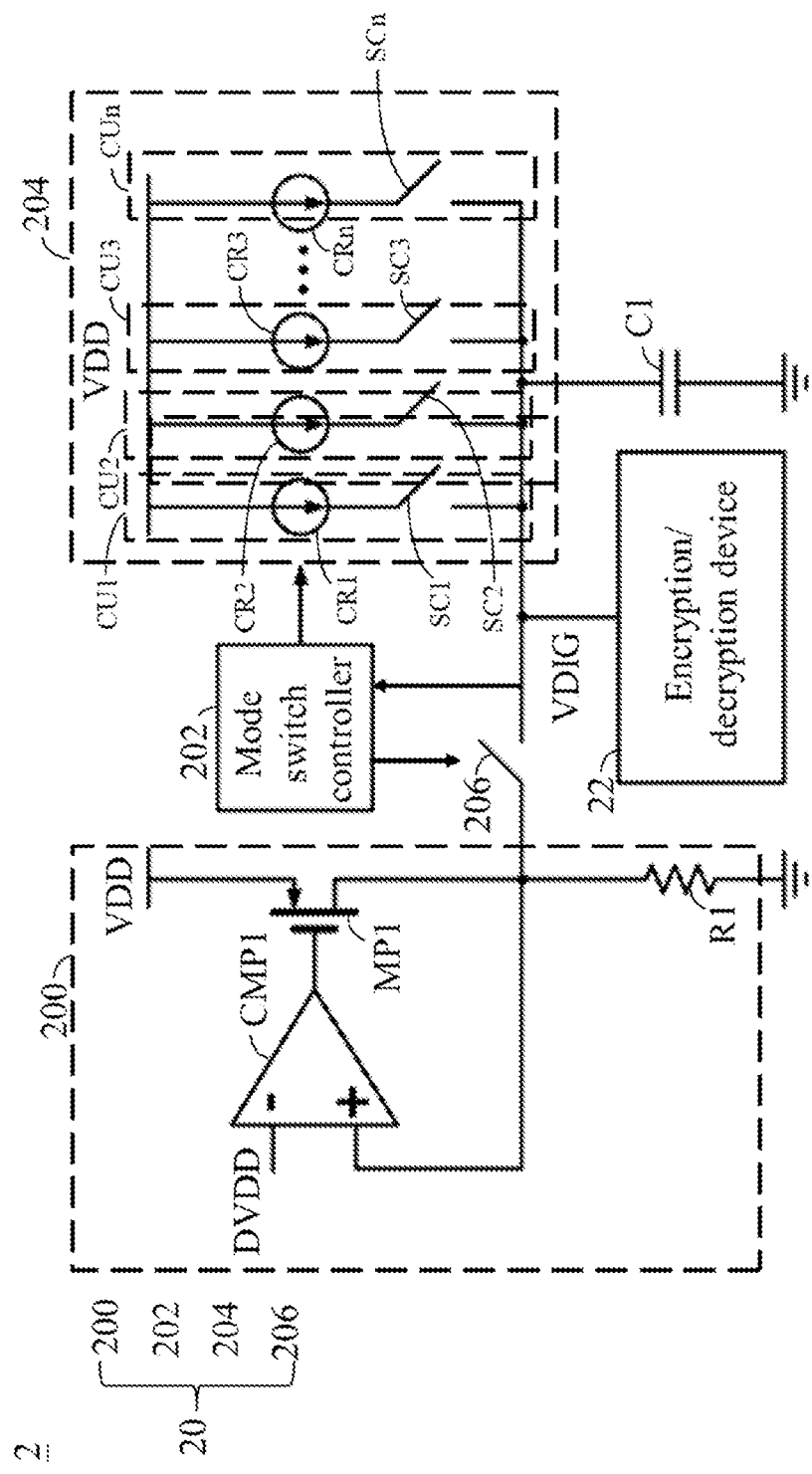
FIG. 2 is a circuit diagram of a secure system according to an embodiment of the present disclosure.

Firstly, refer to FIG. 2, which is a circuit diagram of a secure system according to an embodiment of the present disclosure. A secure system 2 includes a power supply device 20 and an encryption/decryption device 22, wherein the power supply device 20 includes a stable voltage source 200, a mode switch controller 202, a secure power supply device 204 and a switch 206. The power supply device 20 is configured to provide power to the encryption/decryption device 22 of the secure system 2, in order to prevent hackers from gaining the security information by obtaining the change of a power characteristic through detecting a power pin and a ground pin (i.e., the change of the power characteristic of the system voltage). In other words, in the process of the encryption/decryption device 22 executes the encryption/decryption, there is not a large change to the power characteristic of the system voltage.

The secure power supply device 204 is configured to generate a supply voltage according to the system voltage and provide the supply voltage, wherein the supply voltage is applied to the encryption/decryption device 22 to be a driving voltage VDIG for driving the encryption/decryption device 22 (associated with the conductivity or open of the switch 206). Through the secure power supply device 204, when the encryption/decryption device 22 executes the encryption/decryption, the change of the power characteristic of the system voltage is less than a specific range. For example, the change of the circuit or the voltage is less than 5%, but the present disclosure is not limited thereto. However, only when the secure power supply device 204 provides the supply voltage to be the driving voltage VDIG for the encryption/decryption device 22, the secure power supply device 204 may not provide sufficient total output current to the encryption/decryption device 22 as the consumed current required for the encryption/decryption (if there are not enough current switching units in the secure power supply device 204). Therefore, the stable voltage source 200, the mode switch controller 202, and the switch 206 are set in the power supply device 20, so as to solve the technical issue described above.

Figure 3:
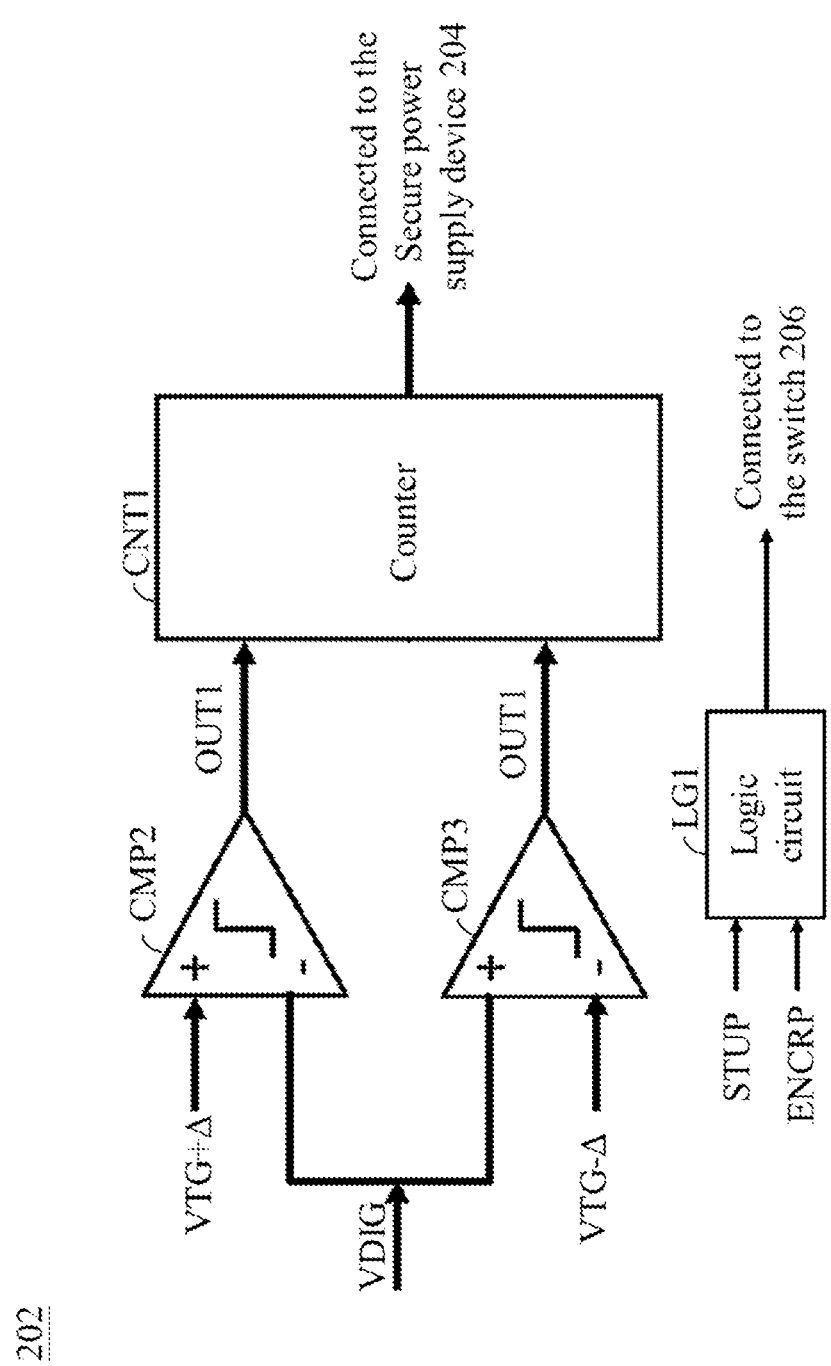
FIG. 3 is a circuit diagram of a mode switch controller according to an embodiment of the present disclosure.

The stable voltage source 200 is configured to provide a stable voltage that is not susceptible to change, wherein the stable voltage source 200 may be realized by a DC-DC convertor such as a bandgap voltage generator or a low-dropout regulator, etc. For example (but the present disclosure is not limited thereto), the stable voltage source 200 may be realized by a comparator CMP1, a resistor R1, and a PMOS transistor MP1 in FIG. 2. The mode switch controller 202 is electrically connected to the encryption/decryption device 22, configured to generate a first switch signal, wherein the first switch signal is generated by an encryption/decryption working signal ENCRP (shown in FIG. 3 and FIG. 4) for indicating whether the encryption/decryption device 22 operates, and the indication signal during the startup period STUP for indicating whether the secure system 2 is in the startup period. One implementation of the mode switch controller 202 is shown in FIG. 3, the details will be introduced later, and the present disclosure is not limited thereto. The switch 206 includes a first terminal, a second terminal and a control terminal, wherein the first terminal is electrically connected to the stable voltage source 200, the second terminal is electrically connected to the encryption/decryption device 22, and the control terminal is electrically connected the mode switch controller 202 in order to receive the first switch signal. The conductivity or open of the switch 206 (i.e., the conductivity or open of the first terminal and the second terminal) is controlled by the first switch signal. Additionally, the secure power supply device 204 is also controlled by the first switch signal. When the switch 206 is turned on, the secure power supply device 204 is controlled to not output the supply voltage. Only when the switch 206 is turned off, the supply voltage is outputted by the secure power supply device 204. For instance, there is an output switch controlled by the first switch signal in the secure power supply device 204.

The total output current generated by the secure power supply device 204 is controlled by second switch signals generated by the mode switch controller 202 according to the driving voltage. When the encryption/decryption device 22 executes the encryption/decryption or during the startup period, once the current consumption is increased, and the driving voltage VDIG of the encryption/decryption device 22 is less than the lower limit voltage, the secure power supply device 204 is controlled by the second switch signals, so as to increase the voltage value of the driving voltage VDIG by increasing the total output current of the secure power supply device 204. On the other hand, once the driving voltage VDIG of the encryption/decryption device 22 is increased to be greater than the upper limit voltage, the secure power supply device 204 is controlled by the second switch signals, so as to decrease the voltage value of the driving voltage VDIG by reducing the total output current of the secure power supply device 204. After the startup period is finished, when the encryption/decryption device 22 does not execute the encryption/decryption, since the stable voltage source 200 has provided the stable voltage as the driving voltage VDIG of the encryption/decryption device 22, thus, the first switch signal generated by the mode switch controller 202 controls the secure power supply device 204 to not provide the supply voltage and generate the total output current to the encryption/decryption device 22.

Figure 4:
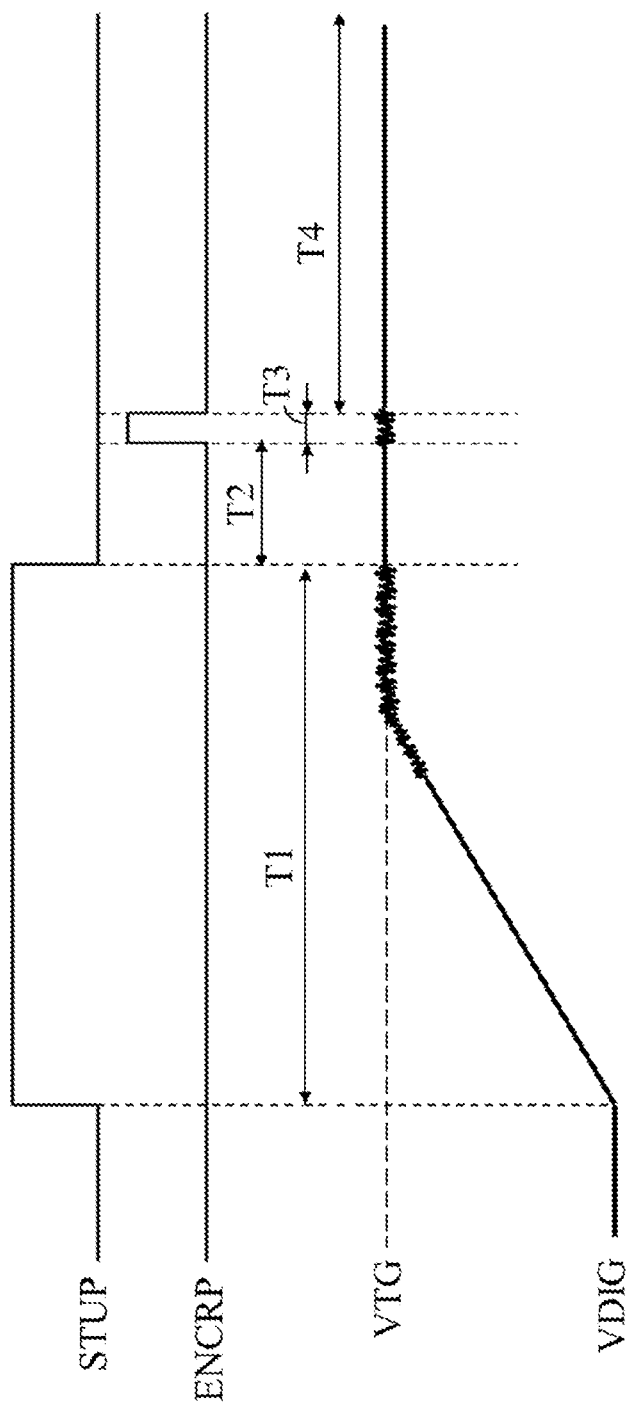
FIG. 4 is a waveform of partial signals of a secure system according to an embodiment of the present disclosure.

Refer to FIG. 2 and FIG. 4, and FIG. 4 is a waveform of partial signals of a secure system according to an embodiment of the present disclosure. During a startup period (the interval T1), the switch 206 is turned off by the first switch signal generated by the mode switch controller 202 (i.e., the first terminal and the second terminal of the switch 206 is turned off), the supply voltage received by the encryption/decryption device 22 is used as the driving voltage VDIG. During the second half (the part that the driving voltage VDIG is jitter lifting) of the startup period (the interval T1), when the driving voltage VDIG adjusted by the supply voltage is fallen within the voltage range between the upper limit voltage and the lower limit voltage, the total output current provided by the secure power supply device 204 may not make the driving voltage VDIG increase or decrease anymore, and the driving voltage VDIG reaches or approaches the target voltage of the driving voltage VDIG at the moment.

After the driving voltage VDIG reaches or approaches the target voltage of the driving voltage VDIG, the startup period (the interval T1) is finished, the switch 206 is turned on by the first switch signal generated by the mode switch controller 202 (i.e., the first terminal and the second terminal are turned on), and the secure power supply device 204 does not provide the supply voltage due to the first switch signal.

After the startup period (the interval T1) is finished, the mode switch controller 202 determines whether selecting the stable voltage or the supply voltage as the driving voltage VDIG according to the encryption/decryption working signal ENCRP. In the interval T2 after the interval T1, the encryption/decryption device 22 does not execute the encryption/decryption, the switch 206 is turned on due to the first switch signal, and the secure power supply device 204 does not provide the supply voltage due to the first switch signal, so that the encryption/decryption device 22 receives only the stable voltage as the driving voltage VDIG.

In the interval T3, the encryption/decryption device 22 executes the encryption/decryption (the encryption/decryption working signal is at the logic high level). The switch 206 is turned off due to the first switch signal, and the secure power supply device 204 is controlled by the second switch signal to adjust the total output current and provide the supply voltage to the encryption/decryption device 22 as the driving voltage VDIG. In the interval T4 after the interval T3, the encryption/decryption device 22 does not execute the encryption/decryption, the switch 206 is turned on due to the first switch signal, and the secure power supply device 204 does not provide the supply voltage, so that the encryption/decryption device 22 receives only the stable voltage as the driving voltage VDIG.

Go back and refer to FIG. 2 again, the stable voltage source 200 may include a PMOS transistor MP1, a comparator CMP1, and a resistor R1. The source of the PMOS transistor MP1 is electrically connected to the system voltage VDD. The output terminal of the comparator CMP1 is electrically connected to the gate of the PMOS transistor MP1, the negative input terminal of the comparator CMP1 receives the voltage less than the target voltage (e.g., another system voltage DVDD less than the system voltage VDD), and the positive input terminal of the comparator CMP1 is electrically connected to the first terminal of the switch 206 and the drain of the PMOS transistor MP1. The resistor R1 includes two terminals, one terminal is electrically connected to the drain of the PMOS transistor MP1, and the other terminal is electrically connected to the low voltage (e.g. the ground voltage). The structure described above is formed to a negative feedback circuit, so that when the comparator CMP1 is in the stable state, the voltages on the positive input terminal and the negative input terminal of the comparator CMP1 are identical.

One implementation of the secure power supply device 204 is described below, but the present disclosure is not limited thereto. The secure power supply device 204 includes a plurality of current switching units CU1~CUn, wherein a plurality of terminals of the plurality of current switching units CU1~CUn are electrically connected to a system voltage VDD, the plurality of other terminals of the plurality of current switching units CU1~CUn are electrically connected to each other and configured to output the supply voltage as the driving voltage VDIG. Also, the plurality of current switching units CU1~CUn are controlled by a plurality of third switch signals, wherein the plurality of third switch signals are composed by the counting signal CNT1 of outputted by the counter for example.

The current switching unit CU1 includes a current source CR1 and a switch SC1, wherein one terminal of the current source CR1 is electrically connected to the system voltage VDD, two terminals of the switch SC1 are respectively electrically connected to the other terminal of the current source CR1 and the system voltage VDD, and the switch SC1 is controlled by the second switch signal. Similarly, the current switching unit CU2 includes a current source CR2 and a switch SC2, the current switching unit CU3 includes a current source CR3 and a switch SC3, the current switching unit CUn includes a current source CRn and a switch SCn, and the ways of the electrical connections between every one of the current sources CR2, CR3, and CRn and the every corresponding one of the switches SC2, SC3, and SCn are similar to the way of the electrical connection between current source CR1 and the switch SC1, so they are not described repeatedly.

When the encryption/decryption device 22 executes the encryption/decryption, the consumption of the current of the encryption/decryption device 22 is increased, and the driving voltage VDIG is decreased. When the driving voltage VDIG is less than the lower limit voltage VTG−Δ, the plurality of the second switch signals generated by the mode switch controller 202 (including the plurality of third switch signals) increases the number of the plurality of conductive current switching units CU1~CUn, so as to increase the total output current of the plurality of current switching units CU1~CUn to improve the voltage of the driving voltage VDIG, wherein Δ is the voltage difference. The total output current of the plurality of current switching units CU1~CUn may be excessive and caused the driving voltage VDIG be increased. When the driving voltage VDIG is greater than the upper limit voltage VTG+Δ, the plurality of the second switch signals generated by the mode switch controller 202 (including the plurality of third switch signals) increases the number of the plurality of opened current switching units CU1~CUn, so as to decrease the total output current of the plurality of current switching units CU1~CUn to reduce the voltage of the driving voltage VDIG.

Incidentally, the power supply device 20 further includes a ripple suppressing unit that is in parallel with the capacitor C1 of the encryption/decryption device 22 and/or in parallel with the encryption/decryption device 22. Through the ripple suppressing unit that is in parallel with the capacitor C1 of the encryption/decryption device 22 and/or in parallel with the encryption/decryption device 22, it is much effective to maintain the stability of the driving voltage, wherein the ripple suppressing unit may be a transistor that the gate of the transistor is configured to receive a fixed bias voltage. Also, the source and the drain of the transistor are respectively configured to receive the driving voltage VDIG and the low voltage (e.g., the ground voltage), so as to suppress the ripple when the driving voltage VDIG changes.

Refer to FIG. 3, which is a circuit diagram of a mode switch controller according to an embodiment of the present disclosure. One implementation of the mode switch controller 202 is shown in FIG. 3, but the present disclosure is not limited thereto. The mode switch controller 202 includes a comparator CMP2, a comparator CMP3, a counter CNT1 and a logic circuit. The comparator CMP2 includes a positive input terminal and a negative input terminal, wherein the positive input terminal is configured to receive the upper limit voltage VTG+Δ, and the negative input terminal is configured to receive the driving voltage VDIG. The comparator CMP3 includes a positive input terminal and a negative input terminal, wherein the positive input terminal is configured to receive the driving voltage VDIG, and the negative input terminal is configured to receive the lower limit voltage VTG-Δ. The counter CNT1 includes two input terminals, wherein one input terminal of the counter CNT1 is electrically connected to an output terminal of the comparator CMP2, and the other input terminal of the counter CNT1 is electrically connected to the output terminal of the comparator CMP3. Further, the counter is configured to count up or down according to an output signal of the comparator CMP2 and an output signal of the comparator CMP3, to generate the counting signal.

Moreover, when the switch 206 is tuned off based on the first switch signal, the counter CNT1 is enabled. Thus, the total output current is increased or decreased by the secure power supply device 204 based on the second switch signal outputted by the counter CNT1, so as to adjust the driving voltage VDIG.

The logic circuit LG1 is configured to receive the indication signal during the startup period STUP and the encryption/decryption working signal ENCRP, so as to generate the first switch signal, and the first switch signal is transferred to the switch 206. Refer to FIG. 3 and FIG. 4, since only when the first switch signal is in the startup period and executes the encryption/decryption, the switch 206 is turned on. Thus, the logic circuit LG1 may be an OR gate of a NOR gate, and the present disclosure is not limited thereto.

Figure 5:
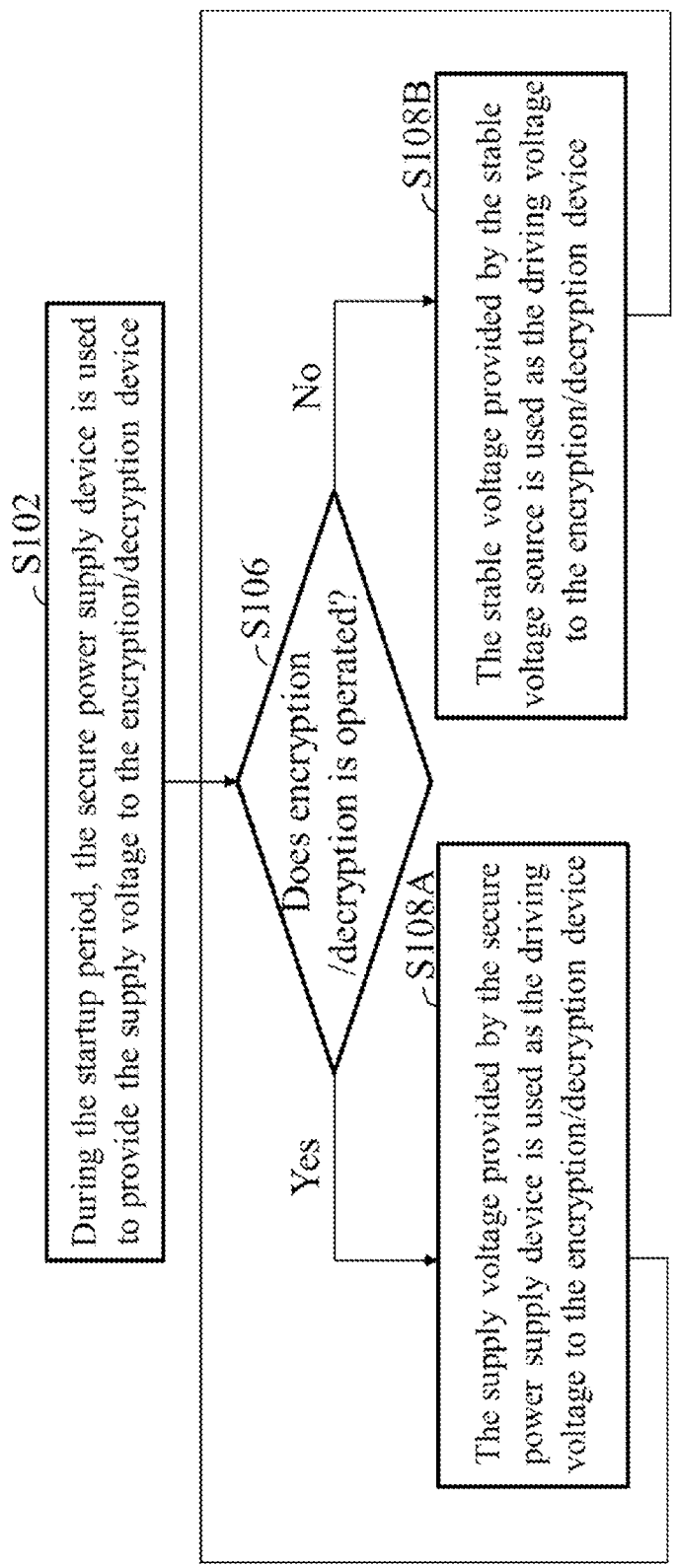
FIG. 5 is a flowchart of a power supplying method according to an embodiment of the present disclosure.

Refer to FIG. 5, and FIG. 5 is a flowchart of a power supplying method according to an embodiment of the present disclosure. The power supplying method is configured to the encryption/decryption device that supplies power to the secure system. The power supplying method is configured to the encryption/decryption device; the method may be executed by the power supply device, and including the following steps. At first, in step S102, during the startup period of the secure system, the supply voltage provided by the secure power supply device is selected as the driving voltage. Next, in step S106, it determines whether the encryption/decryption device executes the encryption/decryption. If the encryption/decryption device does not operate the encryption/decryption, step S108B is executed; otherwise, step S108A is executed. In step S108A, the supply voltage provided by the secure power supply device is used as the driving voltage of the encryption/decryption device. In step S108B, the stable voltage provided by the stable voltage source is used as the driving voltage of the encryption/decryption device.

In summary, a plurality of the power supply devices, methods, and the secure systems provided in the embodiments of the present disclosure may realize the technical effects that preventing hackers from obtaining the security information by detecting the power pin and the ground pin. Additionally, compared to the prior art, the plurality of the power supply devices, methods and the secure systems provided in the embodiments of the present disclosure may further reduce the size that the charge storage capacitor needs, the operating time, the current consumption, and the circuit area. Moreover, it is noted that the system complexity of the plurality of the power supply devices, methods, and the secure systems provided in the embodiments of the present disclosure is not high, so it is easy to implement and without huge manufacturing costs. Thus, there are high practicality and market value for the plurality of the power supply devices, methods, and the secure systems provided in the embodiments of the present disclosure.

All examples and embodiments in the present disclosure are only used to state the purpose. The modifications or changes based on the present disclosure will be suggested to those skilled in the art, and are be included in the essence, the scope, and the scope of the appended claims in the present disclosure.

What is claimed is:

1. A power supply device, configured to supply a power to an encryption/decryption device of a secure system, wherein the power supply device comprises:
a secure power supply device, configured to provide a supply voltage based on a system voltage;
a stable voltage source, configured to provide a stable voltage; and
a voltage selection device, electrically connected to the secure power supply device, the stable voltage source and the encryption/decryption device; wherein
during a startup period of the secure system, or, when an encryption/decryption is executed by the encryption/decryption device after the startup period of the secure system, the voltage selection device selects only the supply voltage as the driving voltage for the encryption/decryption device;
wherein when an encryption/decryption is not executed by the encryption/decryption device after the startup period of the secure system, the voltage selection device selects only the stable voltage as the driving voltage for the encryption/decryption device.

2. The power supply device of claim 1, wherein
in a situation that the voltage selection device selects only the supply voltage as the driving voltage for the encryption/decryption device, when the driving voltage is fallen outside a voltage range between an upper limit voltage and a lower limit voltage, the secure power supply device adjusts the supply voltage until the driving voltage is fallen within the voltage range.

3. The power supply device of claim 2, wherein the voltage selection device comprises:
a mode switch controller, electrically connected to the encryption/decryption device and the secure power supply device, configured to generate a first switch signal, wherein the first switch signal is configured to be generated according to an encryption/decryption working signal and an indicating signal of the startup period, the encryption/decryption working signal is used to indicate whether the encryption/decryption device is executing the encryption/decryption, and the indicating signal of the startup period is used to indicate whether the secure system is in the startup period; and
a switch, comprising a first terminal, a second terminal and a control terminal, wherein the first terminal is electrically connected to the stable voltage source, the second terminal is electrically connected to the encryption/decryption device, and the control terminal is electrically connected the mode switch controller in order to receive the first switch signal.

4. The power supply device of claim 3, wherein
during the startup period, or, when the encryption/decryption is executed by the encryption/decryption device after the startup period of the secure system, the mode switch controller makes the first terminal and the second terminal be turned on, and the supply voltage is received by the encryption/decryption as the driving voltage; and
when an encryption/decryption is not executed by the encryption/decryption device after the startup period, the mode switch controller makes the first terminal and the second terminal be turned off, the stable voltage is received by the encryption/decryption device as the driving voltage, and the first switch signal controls the secure power supply device to not provide the supply voltage.

5. The power supply device of claim 3, wherein the secure power supply device comprises:
a plurality of current switching units, wherein a plurality of terminals of the plurality of current switching units are electrically connected to the system voltage, the plurality of other terminals of the plurality of current switching units are electrically connected to each other and configured to output the supply voltage, and the plurality of current switching units are controlled by a plurality of second switch signals generated by the mode switch controller according to the driving voltage, the upper limit voltage, and the lower limit voltage.

6. The power supply device of claim 1, wherein the stable voltage source comprises:
a PMOS transistor, wherein a source of the PMOS transistor is electrically connected to the system voltage;
a comparator, wherein an output terminal of the comparator is electrically connected to a gate of the PMOS transistor, a voltage lower than a target voltage is received by a negative input terminal of the comparator, and a positive input terminal of the comparator is electrically connected to the first terminal and a drain of the PMOS transistor; and
a resistor, wherein one terminal of the resistor is electrically connected to the drain of the PMOS transistor, and another terminal of the resistor is electrically connected to a low voltage.

7. The power supply device of claim 3, further comprising:
a capacitor, wherein one terminal of the capacitor is electrically connected to the second terminal, and another terminal of the capacitor is electrically connected to a low voltage; and
a ripple suppressing unit, electrically connected to the second terminal, configured to suppress a ripple generated by a change of the driving voltage.

8. The power supply device of claim 5, wherein the mode switch controller comprises:
a first comparator, wherein the upper limit voltage is received by a positive input terminal of the first comparator, the driving voltage is received by a negative input terminal of the first comparator, and the voltage of the upper limit voltage is a total value of a voltage difference plus a target voltage of the driving voltage;
a second comparator, wherein the driving voltage is received by a positive input terminal of the second comparator, the lower limit voltage is received by a negative input terminal of the second comparator, and the voltage of the lower limit voltage is a total value of a voltage difference minus a target voltage of the driving voltage; and
a counter, wherein one input terminal of the counter is electrically connected to an output terminal of the first comparator, and another one input terminal of the counter is electrically connected to an output terminal of the second comparator, and the counter counts up or counts down based to an output signal of the first comparator and an output signal of the second comparator, to generate the first switch signal.

9. The power supply device of claim 8, wherein the mode switch controller further comprises:
a logic circuit, configured to receive the indicating signal of the startup period and the encryption/decryption working signal, and generate the first switch signal according to the indicating signal of the startup period and the encryption/decryption working signal.

10. A secure system, comprising:
an encryption/decryption device; and
a power supply device, configured to supply power to the encryption/decryption device of a secure system, comprising:
a secure power supply device, configured to provide a supply voltage according to a system voltage;
a stable voltage source, configured to provide a stable voltage; and
a voltage selection device, electrically connected to the secure power supply device, the stable voltage source and the encryption/decryption device; wherein
during a startup period of the secure system, or, when an encryption/decryption is executed by the encryption/decryption device after the startup period of the secure system, the voltage selection device selects only the supply voltage as the driving voltage for the encryption/decryption device; and
when an encryption/decryption is not executed by the encryption/decryption device after the startup period of the secure system, the voltage selection device selects only the stable voltage as the driving voltage for the encryption/decryption device.

11. The secure system of claim 10, wherein
in the situation that the voltage selection device selects only the supply voltage as the driving voltage for the encryption/decryption device, when the driving voltage is fallen outside a voltage range between an upper limit voltage and a lower limit voltage, the secure power supply device adjusts the supply voltage until the driving voltage is fallen within the voltage range.

12. The secure system of claim 11, wherein the voltage selection device comprises:
a mode switch controller, electrically connected to the encryption/decryption device and the secure power supply device, configured to generate a first switch signal, wherein the first switch signal is configured to be generated according to an encryption/decryption working signal for indicating whether the encryption/decryption device is executed the encryption/decryption, and an indicating signal of the startup period for indicating whether the secure system is in the startup period; and
a switch, comprising a first terminal, a second terminal and a control terminal, wherein the first terminal is electrically connected to the stable voltage source, the second terminal is electrically connected to the encryption/decryption device, and the control terminal is electrically connected the mode switch controller in order to receive the first switch signal.

13. The secure system of claim 12, wherein
during a startup period, or, when an encryption/decryption is executed by the encryption/decryption device after the startup period of the secure system, the mode switch controller makes the first terminal and the second terminal be turned on, and the supply voltage is received by the encryption/decryption as the driving voltage; and
when an encryption/decryption is not executed by the encryption/decryption device after the startup period, the mode switch controller makes the first terminal and the second terminal be turned off, the stable voltage is received by the encryption/decryption device as the driving voltage, and the first switch signal controls the secure power supply device to not provide the supply voltage.

14. The secure system of claim 12, wherein the secure power supply device comprises:
a plurality of current switching units, wherein a plurality of terminals of the plurality of current switching units are electrically connected to the system voltage, the plurality of other terminals of the plurality of current switching units are electrically connected to each other and configured to output the supply voltage, and the plurality of current switching units are controlled by a plurality of second switch signals generated by the mode switch controller according to the driving voltage, the upper limit voltage, and the lower limit voltage.

15. The secure system of claim 10, wherein the stable voltage source comprises:
   a PMOS transistor, wherein a source of the PMOS transistor is electrically connected to the system voltage;
   a comparator, wherein an output terminal of the comparator is electrically connected to a gate of the PMOS transistor, a voltage lower than a target voltage is received by a negative input terminal of the comparator, and a positive input terminal is electrically connected to the first terminal and a drain of the PMOS transistor; and
   a resistor, comprising two terminals, wherein one terminal of the resistor is electrically connected to the drain of the PMOS transistor, and the other terminal of the resistor is electrically connected to a low voltage of the PMOS transistor.

16. The secure system of claim 12, further comprising:
   a capacitance, comprising two terminals, wherein one terminal is electrically connected to the second terminal, and the other terminal is electrically connected to a low voltage; and
   a ripple inhibited unit, electrically connected to the second terminal, configured to inhibit the ripple generated by a variation of the driving voltage.

17. The secure system of claim 14, wherein the mode switch controller comprises:
   a first comparator, wherein the upper limit voltage is received by a positive input terminal of the first comparator, the driving voltage is received by a negative input of the first comparator, and the voltage of the upper limit voltage is a total value of a target voltage of the driving voltage plus a voltage difference;
   a second comparator, wherein the driving voltage is received by a positive input terminal of the second comparator, the lower limit voltage is received by a negative input terminal of the second comparator, and the voltage of the lower limit voltage is a total value of the target voltage of the driving voltage minus the voltage difference; and
   a counter, wherein one input terminal of the counter is electrically connected to an output terminal of the first comparator, and the other input terminal of the counter is electrically connected to an output terminal of the second comparator, and the counter counts up or counts down based to an output signal of the first comparator and an output signal of the second comparator to generate the first switch signal.

18. The secure system of claim 17, wherein the mode switch controller further comprises:
   a logic circuit, configured to receive the indicating signal of the startup period and the encryption/decryption working signal, and generate the first switch signal according to the indicating signal of the startup period and the encryption/decryption working signal.

19. A power supplying method, configured to provide a power to an encryption/decryption device of a secure system, comprising:
   during a startup period of the secure system, a supply voltage provided by a secure power supply device is selected as the driving voltage for the encryption/decryption device;
   when an encryption/decryption is executed by the encryption/decryption device after the startup period of the secure system, the supply voltage is selected as the driving voltage for the encryption/decryption device; and
   when the encryption/decryption is not executed by the encryption/decryption device after the startup period of the secure system, a stable voltage provided by a stable voltage source is selected as the driving voltage for the encryption/decryption device; wherein
   in a situation that the supply voltage is selected as the driving voltage for the encryption/decryption device, when the driving voltage is fallen outside a voltage range between an upper limit voltage and a lower limit voltage, the supply voltage is adjusted until the driving voltage is fallen within the voltage range.

* * * * *